United States Patent
Soryal et al.

(10) Patent No.: US 12,363,164 B2
(45) Date of Patent: *Jul. 15, 2025

(54) METHOD AND SYSTEM FOR DETECTION OF PHISHING EMAILS AND SUSPECT MALICIOUS EXECUTABLE HYPERLINKS

(71) Applicant: AT&T Intellectual Property I, L.P., Atlanta, GA (US)

(72) Inventors: Joseph Soryal, Glendale, NY (US); Dylan Reid, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/668,671

(22) Filed: May 20, 2024

(65) Prior Publication Data
US 2024/0314165 A1 Sep. 19, 2024

Related U.S. Application Data

(63) Continuation of application No. 17/373,365, filed on Jul. 12, 2021, now Pat. No. 12,028,374.

(51) Int. Cl.
| | |
|---|---|
| H04L 29/06 | (2006.01) |
| G06N 5/04 | (2023.01) |
| G06N 20/00 | (2019.01) |
| H04L 9/40 | (2022.01) |

(52) U.S. Cl.
CPC ........... *H04L 63/1483* (2013.01); *G06N 5/04* (2013.01); *G06N 20/00* (2019.01)

(58) Field of Classification Search
CPC ....... H04L 63/1483; G06N 20/00; G06N 5/04
See application file for complete search history.

(56) References Cited

U.S. PATENT DOCUMENTS

| | | | |
|---|---|---|---|
| 2006/0021029 A1* | 1/2006 | Brickell | G06F 21/51 726/22 |
| 2018/0270272 A1* | 9/2018 | Sagan | G06F 21/36 |
| 2020/0249972 A1* | 8/2020 | Toy | G06F 9/545 |
| 2022/0237285 A1* | 7/2022 | Arnon | G06F 21/554 |
| 2023/0010945 A1 | 1/2023 | Soryal et al. | |

* cited by examiner

*Primary Examiner* — Evans Desrosiers
(74) *Attorney, Agent, or Firm* — Guntin & Gust, PLC; Dana B. LeMoine

(57) ABSTRACT

Aspects of the subject disclosure may include, for example, receiving, at a device, a message over a communication network from a remote source, determining if the message includes executable code and initiating a virtual machine in an isolated portion of the memory of the device responsive to the determining the message include executable code. Aspects of the subject disclosure further include executing, by the virtual machine, the executable code within the isolated portion of the memory, monitoring, by an artificial intelligence module, activities of the executable code during the executing the executable code and determining if the executable code comprises malicious code responsive to the monitoring activities of the executable code. Aspects of the disclosure further include deleting the executable code from the device in response to a determination that the executable code comprises malicious code. Other embodiments are disclosed.

20 Claims, 8 Drawing Sheets

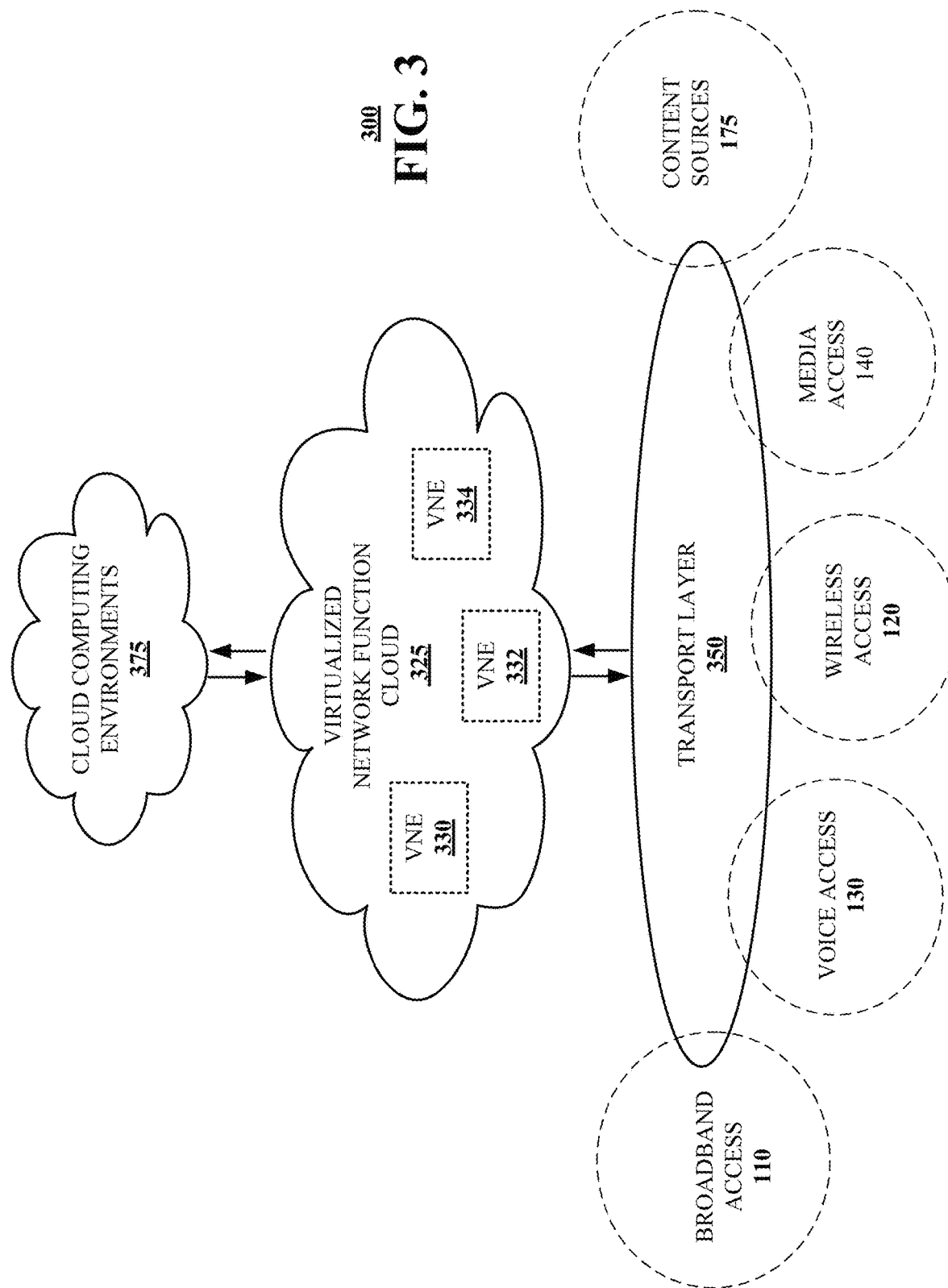

METHOD AND SYSTEM FOR DETECTION OF PHISHING EMAILS AND SUSPECT MALICIOUS EXECUTABLE HYPERLINKS

CROSS-REFERENCE TO RELATED APPLICATION(S)

This application is a continuation of U.S. patent application Ser. No. 17/373,365, filed Jul. 12, 2021. All sections of the aforementioned application(s) are incorporated herein by reference in its entirety.

FIELD OF THE DISCLOSURE

The subject disclosure relates to detection of phishing emails and suspected malicious executable hyperlinks for example using artificial intelligence.

BACKGROUND

A persistent, pernicious problem is the presence of malicious executable hyperlinks or code contained in electronic mail (email) messages, text messages and web pages viewed on a user's device. Some of these are detected by anti-virus software but others are not detected and may cause damage, loss of data and disclosure of private information on the user's device.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein.

DETAILED DESCRIPTION

Figure 1:
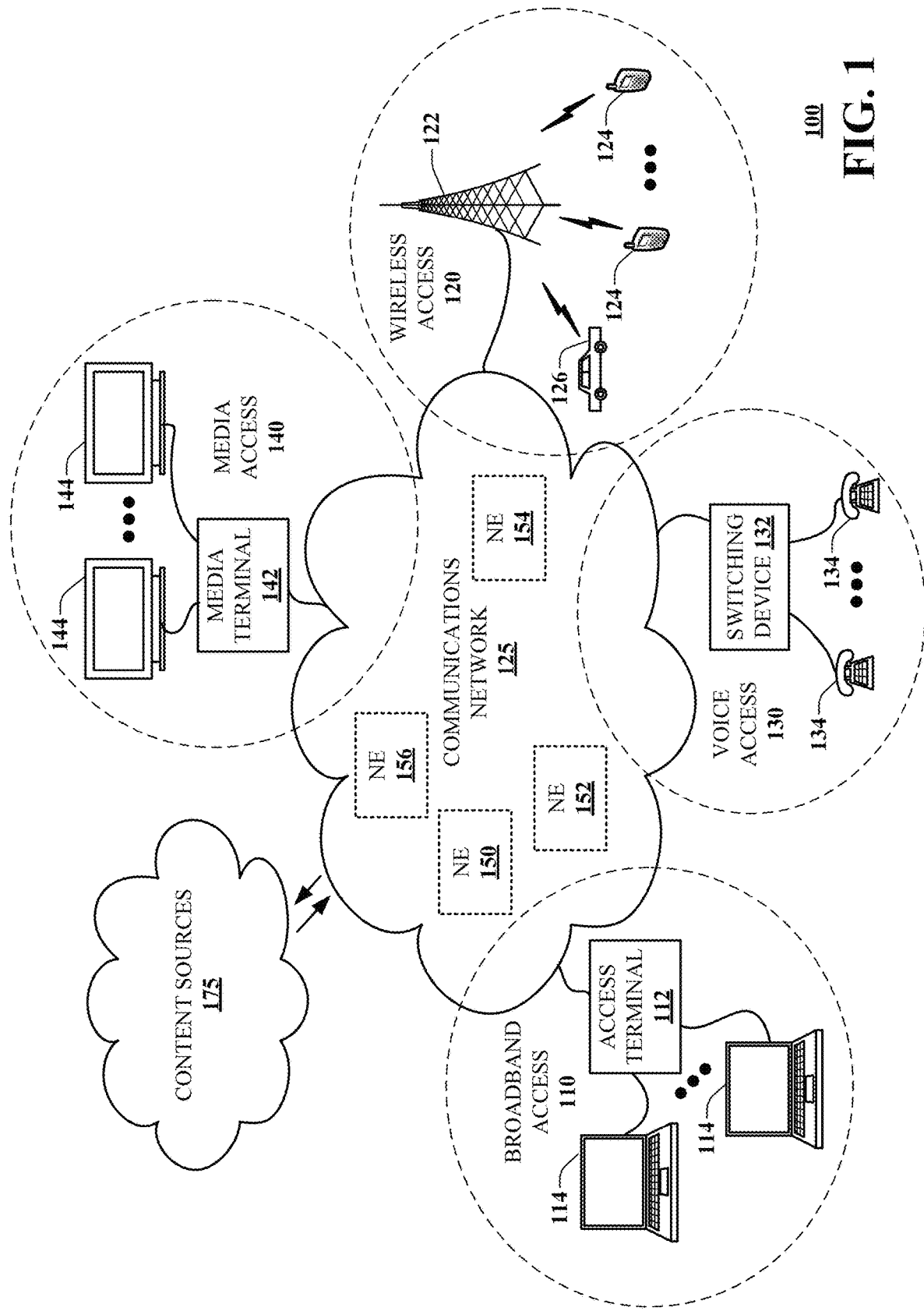
FIG. 1 is a block diagram illustrating an exemplary, non-limiting embodiment of a communications network in accordance with various aspects described herein.

The subject disclosure describes, among other things, illustrative embodiments for detecting and neutralizing potentially malicious executable code and clickable links in a user device such as a mobile phone, tablet or laptop computer. One or more embodiments can use artificial intelligence in addition to trained models to facilitate detecting and neutralizing malicious code or a malicious link. Other embodiments are described in the subject disclosure.

One or more aspects of the subject disclosure include receiving, at a device, a message over a communication network from a remote source, determining if the message includes executable code and initiating a virtual machine in an isolated portion of the memory of the device responsive to the determining the message include executable code. Aspects of the subject disclosure further include executing, by the virtual machine, the executable code within the isolated portion of the memory, monitoring, by an artificial intelligence module, activities of the executable code during the executing the executable code and determining if the executable code comprises malicious code responsive to the monitoring activities of the executable code. Aspects of the disclosure further include deleting the executable code from the device in response to a determination that the executable code comprises malicious code.

One or more aspects of the subject disclosure include identifying a selectable link in a communication received over a communication network at a user device, temporarily preventing a user of the user device from activating the selectable link during a review period, instantiating a virtual machine in the memory responsive to the identifying a selectable link and accessing, by the virtual machine, the selectable link to determine if the selectable link is malicious. Aspects of the disclosure further include receiving communications from a remote network device over the communication network wherein the remote network device is associated with the selectable link, monitoring, by an artificial intelligence module, the communications from the remote network device to determine if the selectable link comprises malicious code, and deleting the selectable link and the communications from the user device in response to a determination that the selectable link comprises malicious code.

One or more aspects of the subject disclosure include receiving, by a processing system including a processor and a memory, a communication from a remote source, wherein the communication is received over a data network and includes one of information defining a message or information defining a web page, identifying executable code of the communication and instantiating a virtual machine in an isolated portion of the memory responsive to the identifying executable code. Aspects of the disclosure further include processing on the virtual machine code of the executable code to isolate the executable code within the virtual machine, identifying prohibited malicious activities of the executable code, identifying the executable code as malicious based on the prohibited malicious activities, and preventing further processing of the executable code outside of the virtual machine.

Referring now to FIG. 1, a block diagram is shown illustrating an example, non-limiting embodiment of a system 100 in accordance with various aspects described herein. For example, system 100 can facilitate in whole or in part receiving a communication such as a message or web page at a user device, identifying executable code or a clickable link in the communication, launching or instantiating a virtual machine within the user device, and processing the executable code or clicking the link within the virtual machine in an isolated portion of memory. The activities and behavior of the code are monitored in a quarantined maze to allow the code controlled access to aspects of the user device such as user files, photographs, a camera and a microphone. Access of the code is monitored until malicious activities are detected. For a clickable link, a remote website associated with the link are allowed controlled access to the user device within the virtual machine until malicious activities are detected. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VOIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or another communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VOIP gateway or other gateway device and/or other switching device. The telephony devices 134 can include traditional telephones (with or without a terminal adapter), VOIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
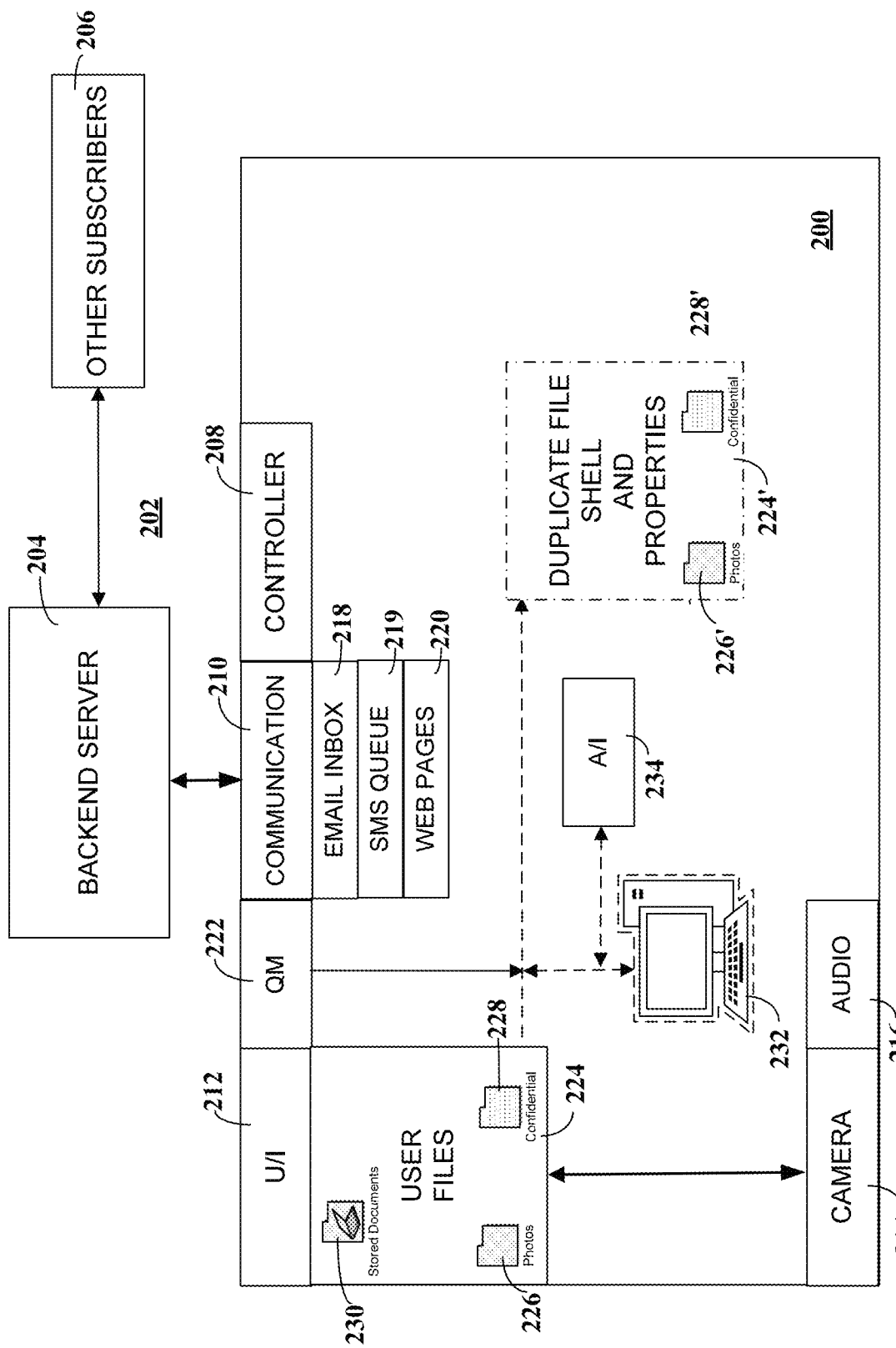
FIG. 2A is a block diagram illustrating an example, non-limiting embodiment of a system functioning within the communication network of FIG. 1 in accordance with various aspects described herein.

FIG. 2A is a block diagram illustrating an example, non-limiting embodiment of a system functioning within the communication network of FIG. 1 in accordance with various aspects described herein.

User devices such as mobile devices including cellular telephones, tablet computers and portable computers, provide access to user accounts and to communication services. User accounts may include stored user data located on the user device, on a remote server or on the cloud network. Communication services may include wireless services such as cellular telephony and Wi-Fi access to a private or public router or access point. Communication services may further include wireline access to a network connection such as a direct subscriber line (DSL) or cable television connection. Communication services may include internet access, electronic mail (email) and short message service (SMS) features. SMS messaging may be a feature of a communication standard such as a cellular air interface standard. Or SMS messaging may be provided through an application program running on the user device. Email messaging similarly is provided through an added-on application program (app) on the user device. Email messaging provides access to an email account of the user. The email account may be accessible from a wide range of devices by the user.

Email and SMS messaging form a substantial threat vector for cybersecurity services of a network provider and users. An email message or an SMS message may include text or graphics or both. The email message or SMS message may be a phishing message intended to attract the user's interest and a click through or other activity. Moreover, an email message or an SMS message may include an executable link. The user may click on the link intentionally or unknowingly. When the executable link is selected or activated, the link may cause a web browser or other application program of the user device to be redirected to a particular web site or destination. In some cases, the redirection is malicious and can cause dangerous code to be transferred to the user device or user data to be transferred from the user device. This can happen with the user having no awareness of the occurrence.

Similarly, S content that has been received at a user device will often have selectable or embedded links that may be selected. For example, a news article may have links to related content at other web sites or network locations. The links may be selected by the user, such as by clicking through with a mouse or touching the link on a touch-sensitive display, to obtain additional related content. Social media often include selectable links to other information, including in association with a photograph or graphical item. Sometimes the links on this non-message content may be malicious or lead to malware or data corruption or user data disclosure. Some malicious links may be disguised as conventional, legitimate links. For example, many web pages or windows follow a web-design convention of including a graphical X that may be clicked to close the web page or window. Other web pages or windows may include text such as the word CLOSE which is a signal to click the link to close the page or window of the web browser on which the page is displayed. In some cases, the conventional web design element, such as the X in the corner of the page, is actually a malicious link or an executable file that can affect the web browser and the user device.

In another example, it is possible to set up a malicious subnetwork within a legitimate network. As an example, LegitimateRetailer.com may be recognized as a legitimate website of a respected retailer. It may be possible to set up within the parent domain, LegitimateRetailer.com, a subdomain which appears to be legitimate and related to the parent domain but is actually a fraudulent or malicious site. Some virus detection software may see the parent domain name and not realize that the subdomain is fraudulent. The subdomain may be used as a way to fraudulently collect users' credit card information, for example. Any link in a message, content item or other document received at a user device may be malicious and may go undetected.

Conventionally, phishing emails and text messages have been dealt with through diversion into a protective sandbox or other containment area of a network, without executing the code. Once the suspected email or SMS message is contained, antivirus applications are then run on the suspected message to look for and identify malicious code. This may be done by comparing the suspected code with virus code known to be malicious. If the antivirus application detects malicious code in the suspected message, the suspected message can be deleted automatically, a warning may be provided to the user, or other protective steps may be taken. Links within content items may be similarly examined and compared with a blacklist of known malicious links and the user device may be prevented from following the link.

Use of conventional antivirus software has limitations on its effectiveness in detecting and responding to phishing messages and other suspicious messages. First, the antivirus software operates by comparing code contained in the message with known malicious code. If the virus or other malicious code is new or has been altered from what has previously been identified as malicious code, the antivirus software may fail to detect the new malicious code. Current antivirus software may detect and prevent some blocked senders and malicious activity. However, the malicious code may appear normal to the antivirus software and the antivirus software may make no attempt to follow up on behavior and operation of the code beyond an initial comparison with known malicious code. Further, most conventional detection systems operate after the fact, meaning after a malicious link has been clicked and problems were discovered. The discovered problems are used to prevent the same attack in the future, but some number of users must fall victim to the virus before it is reliably identified, countermeasures are developed and distributed.

In accordance with various aspects described herein, a system and method may instantiate virtual machines within a user device which operate to detect malicious messages. The system and method may be embodied as an application program downloaded and operating in the background on the user device. The app will spin up the virtual machine and will simulate actions of the user of the user device. The virtual machine will operate in the background and effectively click on a link in a message or content item. The virtual machine will follow the path of the link and emulate actions of a human user while monitoring the behavior of the device responsive to the link. If fraudulent or malicious activity or redirection is detected, the virtual machine will suspend operation by the malware and may provide a user warning. In an embodiment, information is reported to a central service to be shared among other users to identify and detect the malware.

In an embodiment, a system and method operate to identify executable links, initially by comparing with a blacklist of forbidden links, a whitelist of permitted or trusted, links, or both. An unknown executable link that is not whitelisted or blacklisted is quarantined until the link is verified to be a valid and authorized executable. If the link is determined to be malicious, the system and method may trigger an alarm and discard the link and block similar links in the future.

In embodiments, an artificial intelligence (AI) module analyzes the email or other message or the context of a hyperlink or executable file. The hyperlink or executable file may be detected in text or graphical form. In the case of an encrypted message where the link cannot be directly read by the processor of the user device, a screenshot of display created by the message may be taken by the AI module and the images scanned, such as by optical character recognition, to identify a link in the display that invites selection by the user. The AI module will determine expected behavior in response to selecting the hyperlink or the executable file based on similar emails. Operating in the background on a user device, and prior to the user taking action by selecting a link or executable file, the AI module simulates human behavior and clicks on or otherwise selects the suspicious link in the background. The AI module will verify the intention of this action both internally and externally to the device. The AI module links to what is advertised on the email or other message or content item and realized by AI to actions taken as a result of clicking the link.

In an embodiment, a system and method are implemented as an intelligent application that resides on the native machine of the user. The machine may be a mobile device such as a cell phone, a portable device such as a tablet computer or laptop computer or other type of computer, or the machine may be a server in data communication with the machine of the user. The intelligent application may be referred to as a quarantined maze (QM) and instantiates a virtual machine (VM). QM creates a very lightweight virtual machine. That is, the VM contains little data and occupies relatively little memory or processing time, at least initially. The VM replicates some or all of the files and folder structure of the host machine, using the same paths and pathnames of the file structure. Upon creation, QM appears to external devices to have the same file and folder details and the same sizes in bytes as the original machine. In actuality, the VM is initially just an empty shell. Further, QM reports other parameters that match the parameters of the real files and folders of the host machine, such as file names, last modified time stamps, numbers of files, type of files included, access privileges, and so on.

Embodiments are particularly useful for protecting against two particular types of attacks. In a first attack, a malicious executable or fraudulent link or other code attempts to access the user device. This may be an attempt to access files of the device such as photos or other confidential information stored on the device. This may be an attempt to access a camera or microphone of the device. This may be an attempt to install spyware or a so-called trojan horse code element on the device. In a second attack, the link or executable attempts to redirect a web browser or other feature of the device to a bad network location such as a website, ransomware server, etc.

FIG. 2A depicts an illustrative embodiment of a user device 200 operating in a system 202 for detecting suspicious or malicious executable code, in accordance with various aspects described herein. The user device 200 may be a mobile device such as a cellular phone, a tablet computer or laptop computer. The user device 200 may be a desktop or other computer. The user device 200 may interact with, communicate with and exchange data with other devices such as a remote server 204 and other subscribers 206 to a security service managed by the remote server 204. In the illustrated, exemplary embodiment, the user device 200 includes a controller 208, a communication module 210, a user interface 212, a camera 214, an audio module 216, a quarantined maze module 222 and an artificial intelligence module 234. Other embodiments may include other, additional or fewer elements. The user device 200 may be powered by a battery or other power source.

The controller 208 controls operation of the user device 200. The controller may include one or more processors and memory storing instructions and data. The controller may interact with other elements of the user device 200 to control functions and operation of the user device 200. In one example, the controller 208 implements a web browser enabling the user of the user device to access and view web pages provided by remote devices and networks.

The communication module 210 includes hardware and software enabling the user device 200 to communicate data with other devices and with one or more networks. In some embodiments, the communication module 210 implements a cellular telephone function and communicates with a mobile network according to an air interface standard such as GSM, second generation (2G), third generation (3G), fourth generation (4G or long-term evolution LTE) or fifth generation (5G) cellular systems. In some embodiments, the communication module implements communication according to a Wi-Fi standard such as the IEEE 802.x family of standards published by the Institute of Electrical and Electronics Engineers. The communication module 210 may in some embodiments communicate over a wireline connection such as an Ethernet or other standard.

The communication module 210, in particular applications, enables communication of electronic mail (email) messages to and from an email inbox 218. Email messages may include attachments such as files that may be accessed by the user device 200. The communication module 210 further enables communication of messages such as text messages according to a short message service (SMS) application of the air interface standard or messages of a user application (app) installed on the user device 200. The messages may include attachments such as file and photos. The messages may be stored in an SMS queue 219. Email messages and other messages, including any attachments, may be stored in memory of the user device 200. Further, the communication module 210 may operate with the controller 208 to access web pages from web page storage 220 which may be stored in memory of the user device 200.

The user interface 212 includes devices and circuitry permitting a user to interact with the user device 200. In some embodiments, the user interface includes a display screen which may be a touch screen, one or more keys or a keyboard for entry of data and commands, a microphone for detection of sound including speech and a speaker for playback of sound. The user interface 212 may further include haptic devices such as vibrators.

The user interface 212 may enable access to user files 224 stored in memory of the user device. Such user files 224 may include attachments received with email messages or text messages and saved by the user. Such user files may be viewable and modifiable by the user and may be communicated by the user away from the user device, such as by email or text message over a network with which the user device communicates. In the illustrated embodiment, the user files 224 include photo files 226, confidential files 228 and stored documents 230. Photo files 226 include files originating outside the user device 200 and files originating at the user device 200. Confidential files 228 may include any particular information the user of the user device prefers to keep confidential, such as account information, passwords, financial information such as banking information, personal information such as health-related information, and others.

The camera 214 is arranged to take photos or capture images. Such images or photos may be stored as photo file 226 with user files 224 and may be edited or manipulated by the user of the user device 200 and communicated using the communication module 210.

The audio module 216 includes one or more application programs for recording or playing back audio such as music or speech. The audio module 216 may store and retrieve files in the user files 224. The audio module further may include one or more microphones or speakers or provide hardware or software control of microphones or speakers of the user device.

The backend server 204 may communicate with the user device 200 and other subscribers 206. In some embodiments, the backend server 204 cooperates with the user device 200 and other subscribers 206 to implement a service for detecting and protecting against phishing emails and malicious executable hyperlinks. When a link or attachment is detected, it is reported to the remote server 204. The remote server 204 collects and processes information about such phishing emails and malicious executable hyperlinks and provides updated information about such phishing emails and malicious executable hyperlinks to the other subscribers 206 and the user device 200. The service may require that the user of the user device 200 and other subscribers opt-in for coverage and a service provider may charge a fee for the service.

The user device 200 further include a quarantined maze module 222 for implementing the service for detecting and protecting against phishing emails and malicious executable hyperlinks. The quarantined maze module 222 operates to identify executable links or code and compare them with a blacklist of known-bad links or code, a whitelist of known-good links or code, or both to determine if the code or link is trusted. The quarantined maze module 222 further quarantines the suspected links or code that are not trusted until the links or code are verified to be trusted or authorized. The quarantined maze module 222 further determines if the quarantined links or code are malicious and, if so, triggers an alarm and discards the executable link or code. In the illustrated example, the quarantined maze module 222 includes program code and data located on the user device, such as in memory, and executed by a processor such as the controller 208. In other embodiments, the quarantined maze module 222 may be located on a remote server to monitor activities on the user device 200 as well as to monitor activities of other subscribers 206.

Generally, there are two categories of malicious link or executable code. In a first category, clicking a bad link or executable causes the malicious link to attempt to penetrate the computer or processor of the user device 200. The malicious code may attempt to activate the camera 214 or microphone of the audio module or attempt to corrupt or remove one or more user files 224 or user data. This may be referred to as an internal threat. In a second category, the malicious code attempts to direct the user device 200 to a bad website which may be a ransomware server or other malicious site. This may be referred to as an external threat.

In embodiments, the quarantined maze module 222 initiates a lightweight virtual machine (VM) 232 in the memory of the user device. The VM 232 generates a duplicate file shell 224' from the user files 224 in memory and permits the executable code or suspected link to operate on files and data of the duplicate file shell 224'. The duplicate file shell 224' includes just a shell having the external appearance of the file structure of the user files 224 but initially includes no files and little data. For example, the user files 224 includes a folder or photo files 226 named Pictures. Duplicating all files in the folder or photo files 226 may be very memory intensive. Picture or image files can be large in size and require substantial memory to store. Therefore, the VM copies the shell of the folder or photo files 226 with its properties but without its contents, forming shell folder 226'. If a suspected executable tries to access the shell folder 226', the executable will see the shell with the properties, such as file size and properties, but without the contents in. The shell folder 226' remains empty. However, if the executable wants to penetrate the folder, the VM will copy the contents of the original folder photo or files 226 from the user files 224. The contents are copied to the shell folder 226'. In some examples, the files may be corrupted to make them useless to the executable. However, the attempt to access the shell folder 226' prompts the VM to make contents of the original folder or photo files 226 available, like opening a maze to the suspected executable. This allows the VM 232 and artificial intelligence module 234 to monitor and track the activities of the suspected executable. Similarly, if a folder in the user files 225 includes nested folders within a folder, the VM will copy the nested folders as well in order to allow the suspected executable to attempt to access the nested folders. The VM allows the executable to explore in order to learn what the executable is interested in and what the executable is targeted at.

The quarantined maze controls the operating system (OS) of the user device 200 to force newly executable files to be saved on a duplicate path on the VM 232 instead of in the actual user files 224. If the executable is going to be run before saving, the native OS of the user device 200 redirects pointers to the files of the VM 232. The quarantined maze module 222 dynamically invokes and duplicates original files needed to run the suspected executable. This may include OS files and functions. Files are copied from the user files 224 to the duplicate file shell 224' as needed. The copied files and folders in the duplicate file shell 224' will inherit the same credentials as the original files and folders in the user files 224.

The quarantined maze module 222 operates by monitoring activities of the code of the suspected executable. Such activities may include calls to open folders of the file structure, calls to open files within a folder, calls to copy files, calls to delete files, calls to modify files. The quarantined maze module 222 retrieves or duplicates only files that are required at each processing step of the suspected executable. Further, the quarantined maze only performs a single procedure, within the VM and isolated memory space, to in effect see how far the suspected executable will go. Thus, the quarantined maze module 222 operates like a physical maze in that, at each step or turn of the code of the suspected executable, one or more new paths or possible operations becomes visible and one or more new barriers are uncovered. The quarantined maze module 222 monitors progress of the suspected executable through the maze in order to suspend or terminate the suspected executable before it can turn malicious.

The quarantined maze module 222 monitors progress of the suspected executable until the quarantined maze module 222 sees behavior of the suspected executable stop changing from an action or set of actions to a different action. For example, the suspected executable may identify a confidential file among the duplicate file structure and attempts a brute force change of an access password for the confidential file. Repetitive behavior, such as the repeated attempts to change the password, indicate that that was the goal of the executable. The executable does not try any different type of attack. These factors indicate that the progress of the suspected executable through the maze has stopped and the VM should conclude the executable is maline and should therefore suspend and delete the executable.

Thus, the suspected executable file or link runs on an isolated portion of memory and the processor of the user device 200, under control of the quarantined maze module 222 and VM 232. The quarantined maze module 222 and VM 232 includes a machine learning module that monitors normal operations and intrusive behavior. In embodiments, the quarantined maze module 222 and VM 232 receives information about the executable file or link received from, for example, the backend server 204 as part of the central service to be shared among other users to identify and detect the malware. The quarantined maze module 222 and VM 232 monitor behavior of the suspected executable or link and compare the monitored behavior with information received from the backend server 204 based on experiences of other subscribers 206. In an example, if an email message includes a ransomware executable file that improperly tries to copy user files 224 and communicate them to a destination before demanding payment for their return, the backend server 204 may have information about the same ransomware process experienced by other subscribers 206. In embodiments, this includes copying duplicate images or picture files produced by the camera 214. Further, this may include monitoring and limiting the access to the camera or an audio element such as a microphone of the audio module 216 or under control of the audio module, or any other component of the user device such as portions of the user interface 212 or the communication module 210.

In another example, a user has received an email inviting the user to participate in an online video conference with other users. The email includes a link labelled "join meeting." The quarantined maze module 222 isolates the executable associated with the email and allows the executable code to proceed. In this example, the executable code directly proceeds to activate the camera of the user device without first asking permission of the user. The quarantined maze module 222 provides the permission to allow the suspected executable to proceed. If the executable activates the camera and the video conference proceeds without incident within the environment of the VM, the quarantined maze module 222 may report to the backend server 204. The quarantined maze module 222 may identify the email, its sender and other information, and report that the email includes an executable that attempts to access the camera without permission but only after the "join meeting" link was selected. Therefore, the suspected executable is approved.

The process of duplicating and monitoring usage by the VM 232 ensures that the user's data and files in the user files 224 are not corrupted or removed from the user device. Each operation by the suspect link or executable is monitored for its effect on the files of the duplicate file shell 224'. In embodiments, the VM 232 generates only the duplicate files required or called by the suspect link or executable. Files may be organized hierarchically but the VM 232 only duplicates the files at the hierarchy level needed to respond to actions of the suspected link or executable. In embodiments, the VM 232 is given a status of administrator or owner in order to copy and modify files of the user. The quarantined maze module 222 creates the duplicate file shell 224' to appear to have the same structure or form and file and folder properties as the user files 224, including for example, displaying the same file size in bytes. In actuality, the folders and files of the duplicate files 224; are empty unless and until operation of the suspected link or executable require them to be copied. The VM 232 of the quarantined maze module 222 effectively spoofs the user files 224 by disguising all file operations by the suspected link or executable as occurring by the controller 208 on information within or on the user files 224 when in actuality the operations are occurring under control of the VM 232 in the duplicate file shell 224'.

The quarantined maze module 222 in some embodiments includes an artificial intelligence module 234 that reviews received email messages from the email inbox 218, received messages from the SMS queue 219, and received web pages from the web page storage 220. The AI module reviews the content of stored messages and web pages and determines an expected behavior of a user of the user device 200 in response to a message or a web page. The analysis may include processing text and data, including hidden metadata, of the link or web page, and analyzing graphics including photographs contained in a message body or rendered web page or as an attachment to the message or website. Prior to the user taking any action, the AI module simulates human behavior and click on or select a suspected link or execute embedded code. The AI module does this as a background process to verify the intention and operation of the suspected link or code both internal to the user device 200 and external to the user device 200. The AI module follows the suspected link contained in or advertised in a message or email or web page and monitors actions taken as a result of clicking the link or executing the executable code.

Figure 2B:
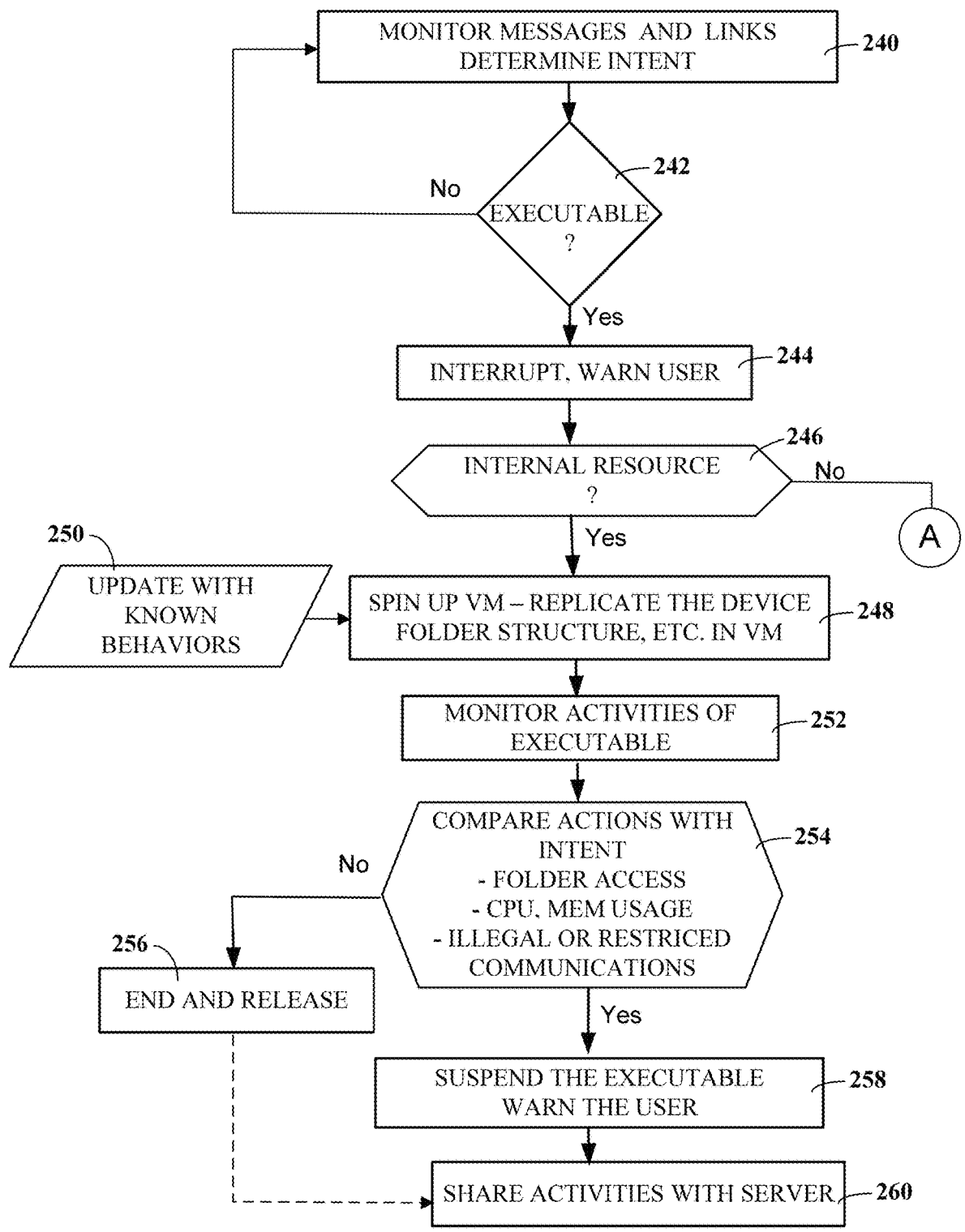
FIGS. 2B and 2C depict an illustrative embodiment of a method in accordance with various aspects described herein.
Figure 2C:
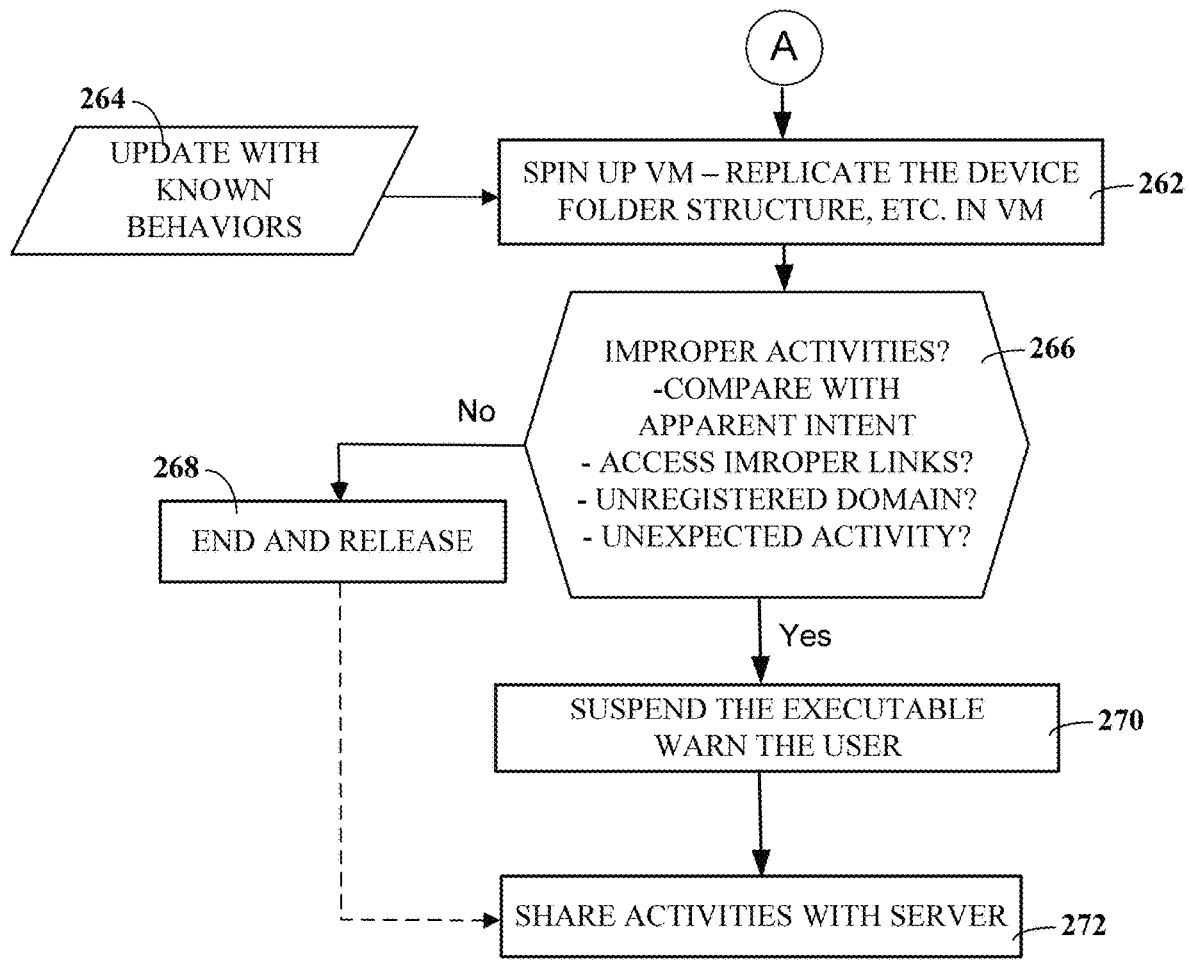

FIGS. 2B and 2C depict an illustrative embodiment of a method 238 in accordance with various aspects described herein. The method may be useful for detecting and damage or disruption due to malware such as phishing emails and text messages and malicious links and executable code at a user device. The user device may be a portable device or wearable device, a laptop computer or any device including an operating system and capable of receiving communications such as electronic mail messages, text and other messages and capable of accessing web sites over a network such as the internet. The method 238 may be performed on the processing system and in the memory of the user device. In some embodiments, the method 238 may be performed remotely from the user device, such as at a server. The method may be part of a security service that monitors the user device for suspicious links and executable code and prevents such links and code from disrupting operation of the user device and protects user data of the user device. The service may collect information about malware from other devices including other subscriber devices and share that information with subscriber devices to detect and neutralize malware.

In some embodiments, the user may be asked to opt-in to the service or the method 238. For example, the user of the user device may be advised that some user information may be provided outside the user device in order to detect malware and ensure security of the user device. If the user approves, the method 238 proceeds. If the user does not approve, the method 238 does not proceed. A record may be maintained of the user's approval.

In some embodiments, the method 238 may be implemented by an application program or app running on the user device. The app generally runs in the background, not visible to the user. However, the app includes a user interface portion which can interact with, for example the display of the user device or the keypad or touch sensitive display of the user device. In this manner, the app can communicate to the user information about status and operations and can receive instructions and other input from the user.

At step 240, method 238 includes monitoring messages at the user device and links or uniform resource locators (URLs) that are processed in the user device. For example, messages may include email messages received at the user device or sent from the user device. Messages may include short message service (SMS) messages or messages communicated by the user device using an application program such as iMessage, Facebook Messenger, WhatsApp, Signal or others. Monitoring links may include detecting a URL that is contained in a message or in a webpage that is accessed by the user device, such as when a web browser loads a web page or is redirected to a web page. Monitoring in accordance with step 240 may include monitoring for portions of code that may be executed by the processing system of the user device. The link or URL or executable code may be contained in hypertext markup language (HTML) which renders a web page or message on a display screen of the user device.

In some embodiments, step 240 may include determining a nature or intent of a message or a web page. This process may be performed in some examples by an artificial intelligence module or agent operating on the user device. Examples of determining the nature or intent of a message include reviewing the text or graphical content of a message or attachments to the message to understand information contained in message. For example, the text of the message may contain keywords that may be recognized and indicate the nature of the message, such as "bank account" or "personal identification number" or "account number." Other keywords may relate to other concepts or topics such as travel or online purchases from a vendor. Further, the keywords and other content of messages may be used to categorize a message such a first category requiring higher scrutiny because it pertains to confidential information by reciting targeted keywords such as "account information," or a second category requiring a lesser degree of scrutiny because the message merely announces a weekly sale at a local grocer. Information may be collected over time and used to categorize messages. For example, if a particular message is compared to others received routinely about a similar topic, the message may be benign. Further, the originator of a message may be compared with previous messages, or with a file of contact information on the user device or associated with a user email account or other information. If the message originated with a known contact of the user, the message may be benign. On the other hand, if the message originates with a source that has not previously contacted the user or user device, the message may merit higher scrutiny.

At step 242, it is determined if a message or link includes executable code. Executable code is code that may be concealed within a message or link that operates to take over control of a processor of the user device. In examples, such executable code may operate to redirect a web browser of the user device. Such executable code may operate to access files of the user device or features of the user device such as the camera or microphone. If no executable code or other high-risk aspect of a message is identified, control returns to step 240. The method 238 may remain in a loop of reviewing messaging, web access and other activity of the user device for potentially malicious activity.

If a potentially malicious message or link is identified at step 242, at step 244, the method 238 operates to interrupt operation and further analyze the message or link. In some embodiments, a warning is provided to the user of the user device. For example, a warning message may be displayed on a user interface, or a tone may be sounded. In another example, message asking the user to wait for a time, such as 30 seconds, while the threat is analyzed and the remainder of method 238 may be performed.

At step 246, the method 238 determines if an internal resource of the user device or an external resource, outside the user device, is affected by the potentially malicious message or link. Internal resources include data and devices contained on or part of the user device, such as data stored in files, photographs or video or audio files, other user information and hardware components such as a camera, microphone or other component of the user device. External resources include web pages or other remote network destinations. External resources may be identified by an executable link with a Uniform Resource Locator (URL) or a network address to which a browser or other component of the user device may be directed. If an external resource is affected by the potentially message or link, control proceeds to step 262, FIG. 2C.

If an internal resource is affected by the potentially message or link, at step 248, a virtual machine (VM) is instantiated on the user device, in the memory of the user device, using a processor or device controller of the user device. The VM will perform the actions, including file access, data selection and copying and communication, specified by the lines of code of the suspected executable identified at step 242. For an internal resource, step 248 includes copying a portion of the file structure of the user device, at least to a level and with administrative permissions and data that may be visible to the suspected executable. In embodiments, the copied file structure is maintained in an isolated portion of memory of the user device. The copied file structure appears to the code of the suspected executable to have all properties of the actual file structure, such as folder sizes, file sizes, permissions, etc. In effect, the file structure is spoofed for presentation to the code of the suspected executable so that the suspected executable appears to be operating on the actual file structure of the user device.

In some embodiments, background information 250 about known fraudulent or malicious behaviors is accessed for use by the VM. Such information may be collected and stored as a resource and provided to the user device as an update from time to time. In an embodiment, a network operator provides a security service for subscribers and subscriber devices. The security service operates on one or more network servers or other devices. The security service is in communication with an application program (app) or other feature of subscriber devices including the user device. When suspected executables are identified, information is communicated by the local app to the server for collating and analysis. When malicious behavior is detected, the local app reports the malicious behavior and any related information to the server. Related information includes, for example, email addresses which originated an email message suspected to be malicious, telephone numbers or other network addresses which that are associated with suspected fraudulent text messages, and false individual names or business names or other identification associated with fraudulent messages. The background information 250 may be collected by subscriber devices including the user devices and processed by the server system. Subscribers may pay a fee for the service or agree to provide information to the service in return for receiving the background information.

At step 252, the VM begins processing the suspected executable code. The suspected executable code may be copied to the memory space of the user device assigned to the VM for this purpose. The VM steps through the lines of code of the executable and monitors activities of the code in comparison with unacceptable or potentially fraudulent activities. The VM looks for known suspicious behavior. Examples of such suspicious behavior include an attempt to encrypt all user files or folders. Such behavior may be indicative of a ransomware attempt. Other suspicious behavior includes an attempt to access restricted or privileged files or folders, which may be indicative of intruder software. Another example of suspicious behavior includes compiled code that tries to copy itself into other locations, which may be indicative of a computer virus. Another example of suspicious behavior includes compiled code that tries to modify its code or run an internally embedded executable file, which may be indicative of a computer virus. Another example of suspicious behavior includes a dormant installed application, which may be a sleeper that is activated in the future by an internal clock or by externally receive remote command. Such an application will be kept quarantined until proven to be benign.

At step 254, the VM monitors activities of the executable code while identifying malicious activities of the code. The VM takes steps matching those of a human user to activate a suspected executable such as a link included in a message or on a web page. The VM monitors the result of each step and takes further actions which are appropriate based on context. The VM copies from user files only enough information to allow the suspected executable to take a next step according to the code of the executable. For example, if the executable seeks to access a folder containing image files generated by the camera, the VM copies over a list of contents of the folder but not the actual contents. The VM provides access to the folder, including showing contents of the folder including several subfolders. If the executable seeks to access a subfolder, the VM copies over only the contents of the requested subfolder but nothing else. If the suspected executable seeks to copy a file within the contents of the requested subfolder, the VM may conclude that this is malicious activity and suspend operation of the suspected executable.

Malicious activities include attempts to copy protected information such as user account numbers or other confidential information. Malicious activities further include attempts to access one or more folders or files of the copied file structure. Malicious activities may include attempts to access the central processing unit or memory of the user device. For example, the VM may monitor a number of processor cycles, or an amount of memory accessed by the suspected executable. If the number of processor cycles exceeds a predetermined processor threshold, the VM may conclude that the suspected executable is malicious. Similarly, the VM may monitor the amount of memory accessed by the executable code. If the amount of memory exceeds a predetermined memory threshold, the suspected executable may be identified as malicious. The predetermined processor threshold and the predetermined memory threshold may be selected in any suitable fashion. For example, the artificial intelligence module may estimate suitable thresholds based on the intent determination at step 240. The respective thresholds may be dynamic and variable based on any factors. As the artificial intelligence module learns more about the behavior of the suspected executable, the artificial intelligence module may revise or update the respective thresholds. Any other suitable indication of excessive activity by the executable code, including activity that exceeds what would be expected for a similar message or based on past experience with messages, may be used to monitor the executable code and decide if the executable code is acting maliciously. For example, the VM may monitor attempted communications by the suspected executable. If the suspected executable attempts to communicate information from the user device, such as by sending an email or text message or by activating a web browser to access a network location, the suspected executable may be identified as malicious.

Further, the VM may use an artificial intelligence module or other feature to compare actions by the suspected executable with a derived intent of the suspected executable determined at step 240. If the actual activities are inconsistent with the derived intent, the suspected executable may be identified as malicious. For example, if the derived intent of a received email message is advertisement of weekly grocery specials but the email message includes an executable that attempts to locate credit card information of the by searching all files in the file structure and keying up the cellular radio transmitter to send the message to a remote destination, the suspected executable may be identified as malicious. Similarly, if the derived intent of a text message is to confirm a medical appointment, with the instruction to the user to "enter YES to confirm," but the text message includes executable code that seeks to activate the microphone of the user device, the suspected executable may be identified as malicious.

If at step 254, the VM determines that the suspected executable is safe or is not malicious, at step 256, the method 238 ends and the suspected executable is released to continue processing. Further, the suspected executable may be added to a whitelist of known-good executables so that it may run without intervention subsequently. Still further, the user may be given a notification, such as on the user interface of the user device, that the executable has been approved. Still further, if the user or user device subscribes to or participates in a security service for verifying suspected executables, at step 260, the user device may report the results of the analysis of step 252 and step 254 at step 256, for example, to a server accessible over a network. This reporting step may be optional as indicated by the dashed line in FIG. 2B. The user device may store or provide any suitable information, such as identification information for the executable, files accessed, number of processor cycles or amount of memory consumed, and external resources contacted.

At step 258, if the VM determines that the suspected executable is malicious in nature or poses a risk of damage to the information or hardware or software of the user device, the method 238 will suspend operation of the executable. In some embodiments, the method 238 may produce a warning to the user of the user device, such as a message displayed on the user interface, an audible tone, or other. Step 258 may further include the VM deleting code of the executable from memory as well as all code or data produced by the executable.

The VM may have an implicit bias in favor of suspending or terminating suspected executables. If, based on observed activities of the suspected executable, the VM cannot definitely conclude that the suspected executable is not malicious, the VM may operate to delete the executable rather than approve it.

At step 260, the information that has been learned about the suspected executable is reported to a server. The server operates to collect information about malware and malicious code identified by user devices and may be part of a fraud detection and security service provided by a service provider. The user device may store or provide any suitable information, such as identification information for the executable, files accessed, number of processor cycles or amount of memory consumed, and external resources contacted. The user device may also provide a final resolution to the server including reasons why the suspected executable was terminated.

Referring now to FIG. 2C, if an external resource was affected by a suspected executable, at step 262, a virtual machine (VM) is instantiated on the user device. The VM proceeds to perform the actions specified by the lines of code of the suspected executable identified at step 242. Depending on the executable, such actions may include file access, data copying and communication with external resources, such as by launching a web browser application.

In some embodiments, background information 264 about known fraudulent or malicious behaviors is accessed for use by the VM. Such information may be collected and stored as a resource and provided to the user device as an update from time to time. Such information may be available as part of a security service for subscribers and subscriber devices. The security service operates on one or more network servers or other devices. The security service is in communication with an application program (app) or other feature of subscriber devices including the user device. When suspected executables are identified, information is communicated by the local app to the server for collating and analysis. When malicious behavior is detected at a user device, the local app reports the malicious behavior and any related information to the server. Such information may include, for example, email addresses which originated an email message suspected to be malicious, telephone numbers or other network addresses which that are associated with suspected fraudulent text messages, domain names sought to be accessed by the suspected executable, and false individual names or business names or other identification associated with fraudulent messages.

At step 266, the method 238 may imitate behavior of a user of the user device. For example, if a clickable link is provided in a message, the VM will select or click on the link and observe the behavior that results. The VM will try to reach the server associated with the link and will observe what the server returns. In particular, the VM looks for additional links returned by the server or queries returned by the server or malicious code returned by the server. Additional links or code may be analyzed by the VM to determine if the links or code are malicious. If so, they will be discarded and reported to the backend server or security service.

At step 266, the method 238 monitors the activities of the suspected executable with the external resource. In some embodiments, the method 238 includes comparing the activities of the suspected executable with the intent of the suspected executable or link inferred at step 240. If the activities and the intent are inconsistent, step 266 may conclude the executable is malicious.

Further, the VM monitors the suspected executable to identify links selected or followed by the executable. The VM may maintain a blacklist of improper links or a whitelist of approved links, for example received with background information 264. The VM compares a link address or other information with the blacklist, the whitelist or both before allowing the link to be selected.

In some examples, at step 266 the VM monitors what information is requested when a link is clicked or selected. Examples include information about the processor of the user device, the operating system of the user device, make and model of the user device, a stored home or business address of the user associated with the user device, and a network address of the user device. Requests for personal information such as this may be considered intrusive or malign. In another example, requested information may pertain to interests of the user, such as hobbies, reading interests and so on. Requests for information about user interests may be considered benign. Further, a level of activity or information exchange may indicate a malign intent. For example, a malign website may ask detailed technical information about device capabilities, make and model, whether the camera is enabled. Based on the information provided, the malign website will return substantial data to attempt to hijack the user device or alter the user device or copy or destroy user data. Further actions by the malign website should be suspended by the VM. In contrast, if a website asks about user preferences or even asks for technical information, with no follow-up data exchange, the website may be considered benign by the VM and allowed to proceed.

In another example, if information provided by a suspected website includes one or more encryption keys, the website may be considered malign. Providing encryption keys suggests a ransomware site or other malignant site that should be blocked from further access by the VM.

In another example, the VM may detect a package of software communicated to the user device. If the package includes software or a type of software that was never requested by the user device. Such unrequested software suggests a malign site that should be blocked from further access by the VM.

Tests or thresholds such as these that are performed by the VM may be supplemented by updates received from a remote server, such as part of a security service. As new attack techniques are developed, information about the techniques is disseminated by the server or service.

Moreover, a user may configure a level of security that the user desires to implement for the user device. As an example, a laptop computer the user uses for work may contain highly sensitive files that are employer owned. The user may set a level of security very high for the laptop computer. This may be implemented as a strong bias by the VM in favor disabling suspected executables unless the suspected executable is clearly benign. Similarly, a user device given to a child to use may have a security level set to a high level. In contrast, a user device that is just used for casual web access, television viewing and music listening may be given a relatively low security level by the user. The VM will have a bias in favor of approving suspected executables. For example, unless a suspected executable is on a blacklist maintained by or provided to the user device, the suspected executable may be allowed to proceed.

The VM takes steps matching those of a human user to activate a suspected executable such as a link included in a message or on a web page. The VM monitors the results and take further actions which are appropriate based on context. For example, if an email message includes a link to a website, the VM may in effect click on the link to open a browser window at the website. The VM may display the browser window on the display of the user interface of the device or may block display during analysis of the suspected executable. Clicking the link transfers HTML code and other data from the website. The VM monitors the HTML for executable code that may be received from the website.

Further, the VM monitors the suspected executable by comparing a domain of the link with a list of registered domains, which may be received with background information 264. If the desired domain is not registered with a known domain name registrar, the VM may conclude the suspected executable is malicious.

Further, the VM monitors the suspected executable for any unexpected activity. Expected and permitted activities may be based on the intent of the executable inferred at step 240. If the attempted activity is inconsistent with the inferred intent, the VM may conclude the suspected executable is malicious.

If at step 266, the VM determines that the suspected executable is not malicious, at step 268 the method 238 ends and the suspected executable is released to continue processing. Further, the suspected executable may be added to a whitelist of known-good executables so that subsequently it may run without intervention. Still further, the user may be given a notification, such as on the user interface of the user device, that the executable has been approved. Still further, if the user or user device subscribes to or participates in a security service for verifying suspected executables, at step 272, the user device at step 256 may report the results of the analysis of step 266, for example, to a server accessible over a network. This reporting step may be optional as indicated by the dashed line in FIG. 2C. The user device may store or provide any suitable information, such as identification information for the executable, files accessed, number of processor cycles or amount of memory consumed, external resources including web site contacted, and information transferred between an external resource and the user device.

At step 270, if the VM determines that the suspected executable is malicious in nature or poses a risk of damage to the information or hardware or software of the user device, the method 238 will suspend operation of the executable. In some embodiments, the method 238 may produce a warning to the user of the user device, such as a message displayed on the user interface, an audible tone, or other. Step 270 may further include the VM deleting code of the executable from memory as well as all code or data produced by the executable.

Step 258 and step 270 may include a feature of enhancing security on an aspect of the user device that is determined to be under attack. In one example, if a suspicious executable sought to access image files produced by the camera of the user device, the method may inform the user, such as by a display on the user interface of the user device. Further, the method may offer to the user to enhance security by requiring additional permissions to access the image files, such as by requiring a password or personal identification number (PIN) that must be entered or two-factor authentication or other arrangement. This advice from the method reflects new knowledge that the image files, or other asset of the user device, were under attack and may warrant enhanced protection. The user may respond and specify an additional password that must be entered before external or internal access is provided to the targeted information, in this example the image files.

At step 260, the information that has been learned about the suspected executable is reported to a server. The server operates to collect information about malware and malicious code identified by user devices. The server may be part of a fraud detection and security service provided by a service provider. The user device may store or provide to the server any suitable information, such as identification information for the executable, files accessed, number of processor cycles or amount of memory consumed, and external resources contacted. The user device may also provide information about a final resolution to the server including reasons why the suspected executable was terminated.

Some end-to-end encrypted applications do not allow on-device security to receive what information displayed on the user interface of the user device. The information is encrypted and therefore unable to be displayed. In the case of end-to-end encryption, the artificial intelligence module detects the encryption and takes a screenshot of the display on the user interface. The artificial intelligence module initiates an image processing operation on the displayed image to extract links and suspicious texts and analyze them for malicious intent. For example and optical character recognition (OCR) process may be performed to identify any URL or other information displayed in the user interface. Similarly, other text or graphics may be analyzed through OCR or image recognition to develop an understanding of the intent of the website or application providing the displayed information. If the VM uses a bias against approving some suspected executables, the bias level may be set relatively high for such encrypted messaging. If no threat is detected, the screenshot will be discarded immediately to maintain privacy in accordance with the usage of end-to-end encryption.

Two use cases may be presented to illustrate general principles. In a first use case, a hyperlink is included in a received email inviting the recipient to activate a new bank account. Based on the text and graphical content of the email message, the artificial intelligence module understands the intent of the email message, the offer of a new bank account. Moreover, based on the text and graphical content of the email message, the artificial intelligence module expects the hyperlink to direct the user to a domain registered to the bank or the bank account. The artificial intelligence module also expects that the internal processes will have slightly higher utilization for comparable browsing. If this expected behavior is seen by the artificial intelligence module when processing is isolated in the VM, then the VM will alert the user to follow the email instructions. However, if there is any other deviation from this expected behavior either internally or externally, the VM will raise a flag and warn the user.

In a second use case, a suspicious link is identified in an SMS message on a smart phone. In this case, the artificial intelligence module understands from the content of the text message an intent of the text message. The artificial intelligence module and expects the hyperlink will direct the user to a trusted domain to perform the directions in the text. The artificial intelligence module also expects that the internal processes will have slightly higher utilization for comparable browsing. If the expected behavior is seen by the artificial intelligence module, then the VM will alert the user to go ahead and follow the SMS instructions.

Thus, the use of the virtual machine to test a suspected executable provides a substantial advantage over known anti-virus software services which share information about computer viruses and provide updates or patches to local devices. The updates have information about recently detected viruses. The updates can be used subsequently to protect the local device from the same viruses. In such current systems, some number of users have to be infected with a new virus before the new virus becomes known and a patch is developed and communicated to other local devices. In accordance with various aspects described herein, a suspected new virus or other executable or link is isolated by or within the virtual machine. If the suspected new virus is truly malignant, only the virtual machine will be "infected," and the virtual machine, virus and any corrupt data can be deleted before any actual harm is done to user files or the user device. The malign executable can be isolated, evaluated and eliminated right on the user device and information about the malign executable can be shared to other devices through the backend server.

While for purposes of simplicity of explanation, the respective processes are shown and described as a series of blocks in FIG. 2B and FIG. 2C, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 3, a block diagram is shown illustrating an example, non-limiting embodiment of a virtualized communication network 300 in accordance with various aspects described herein. In particular a virtualized communication network is presented that can be used to implement some or all of the subsystems and functions of system 100, the subsystems and functions of user device 200, and method 238 presented in FIGS. 1, 2A, 2B, 2C, and 3. For example, virtualized communication network 300 can facilitate in whole or in part receiving a communication such as a message or web page at a user device, over the communication network 300, identifying executable code or a clickable link in the communication, launching or instantiating a virtual machine or otherwise accessing an already-operating virtual machine within the user device, and processing the executable code or clicking the link within the virtual machine in an isolated portion of memory. The activities and behavior of the code are monitored in a quarantined maze to allow the code controlled access to aspects of the user device such as user files, photographs, a camera and a microphone. Access of the code is monitored until malicious activities are detected. For a clickable link, a remote website associated with the link are allowed controlled access to the user device, over the communication network 300, within the virtual machine until malicious activities are detected.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements-which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it is elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements do not typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third party locations.

Figure 4:
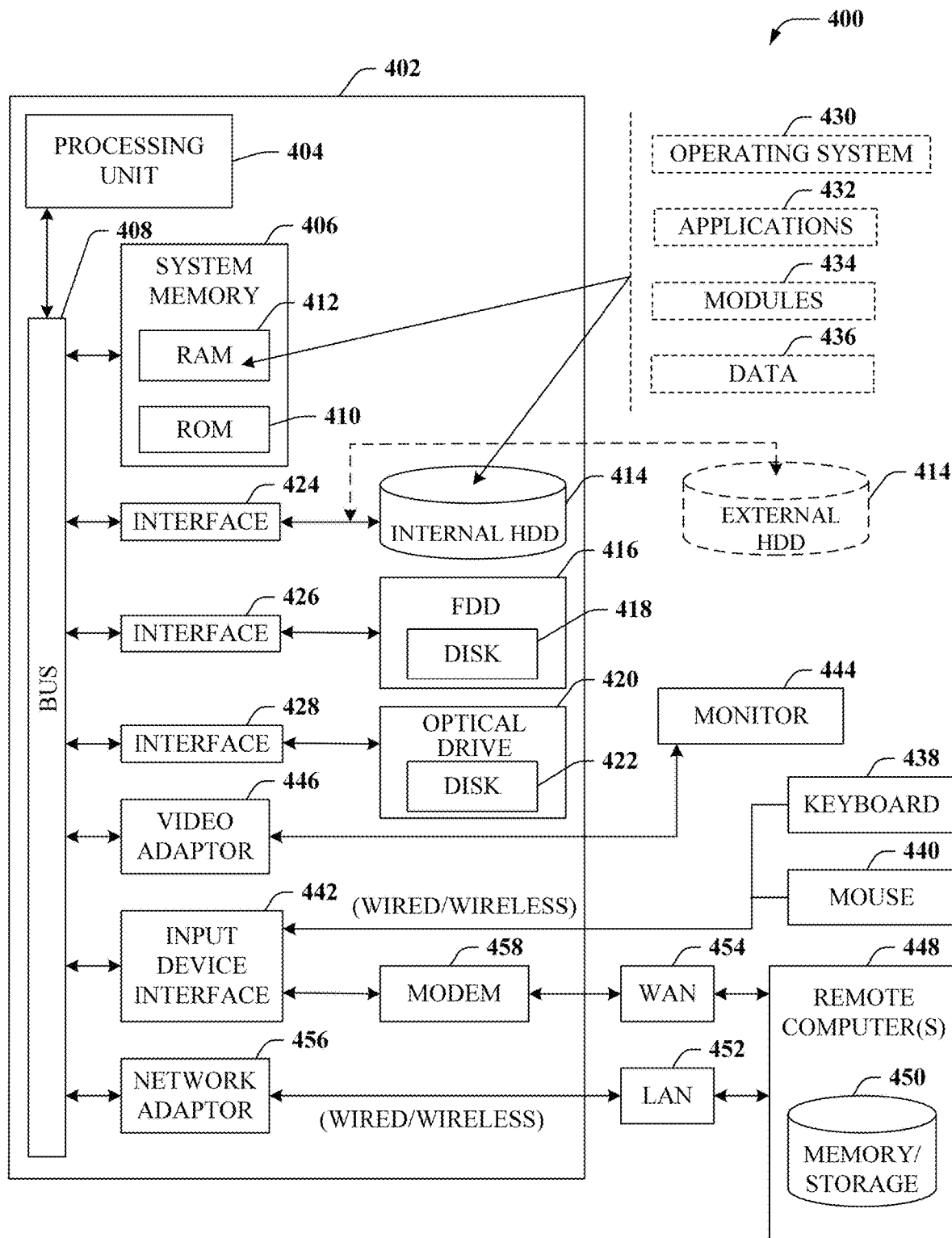
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part receiving a communication such as a message or web page at a user device which incorporates aspects of the computing environment, identifying executable code or a clickable link in the communication, launching or instantiating a virtual machine within the user device, and processing the executable code or clicking the link within the virtual machine in an isolated portion of memory. The activities and behavior of the code are monitored in a quarantined maze to allow the code to have controlled access to aspects of the user device such as user files, photographs, a camera and a microphone. Access of the code is monitored until malicious activities are detected. For a clickable link, a remote website associated with the link are allowed controlled access to the user device within the virtual machine until malicious activities are detected.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/ or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
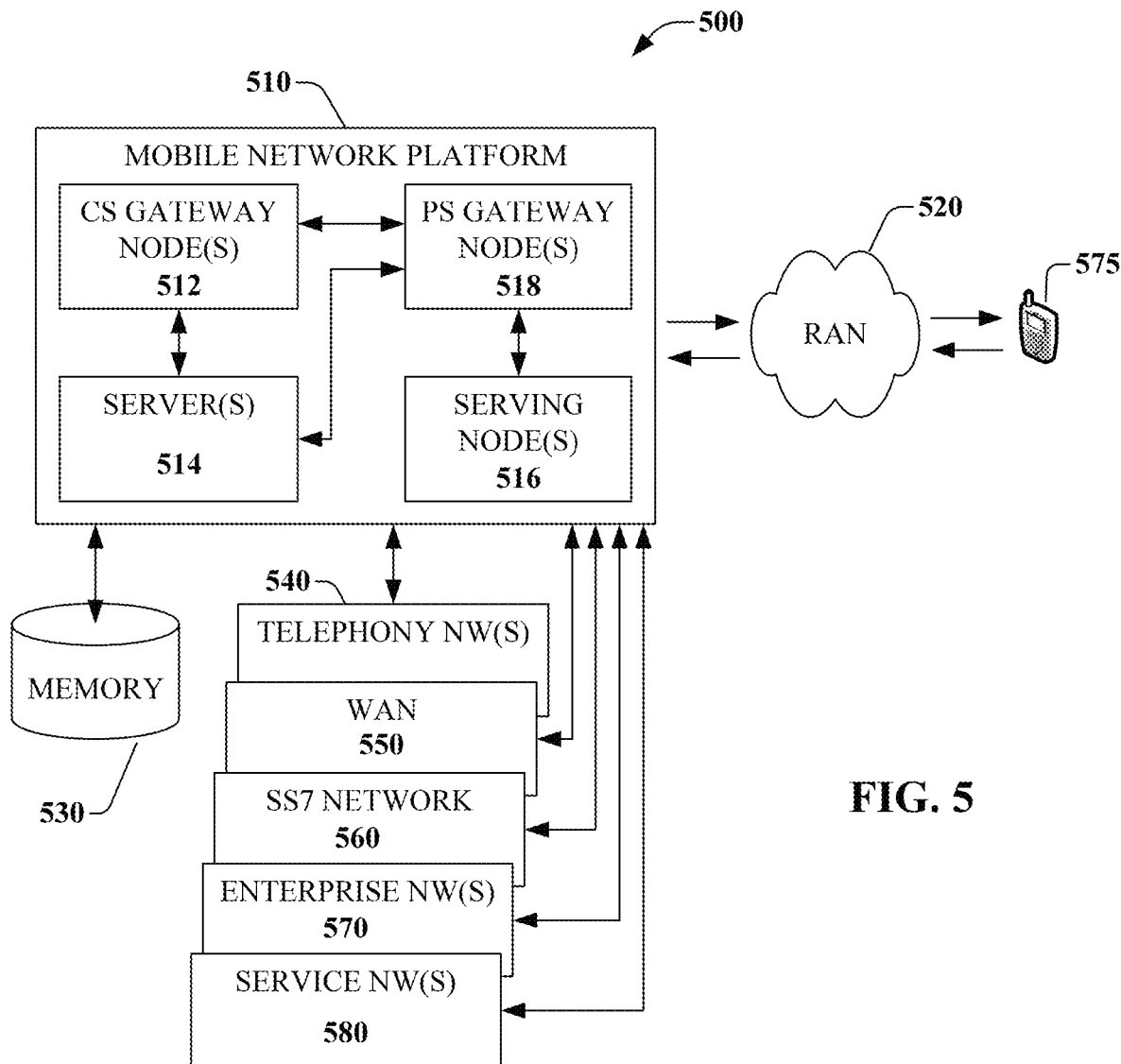
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part receiving a communication such as a message or web page at a user device such as user device 575, identifying executable code or a clickable link in the communication, launching or instantiating a virtual machine within the user device, and processing the executable code or clicking the link within the virtual machine in an isolated portion of memory. The activities and behavior of the code are monitored in a quarantined maze to allow the code controlled access to aspects of the user device such as user files, photographs, a camera and a microphone. Access of the code is monitored until malicious activities are detected. For a clickable link, a remote website associated with the link is allowed controlled access over a network including a radio access network 520 to the user device within the virtual machine until malicious activities are detected. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technologies utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
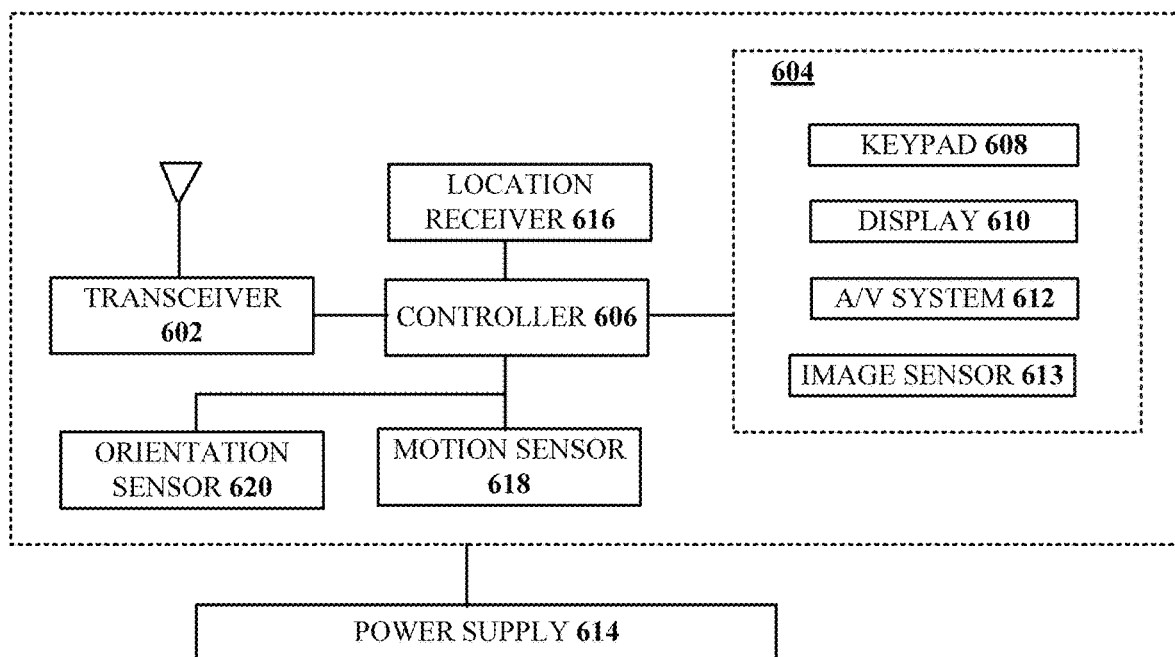
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part receiving a communication such as a message or web page at a user device such as the communication device 600, identifying executable code or a clickable link in the communication, launching or instantiating a virtual machine within the user device, and processing the executable code or clicking the link within the virtual machine in an isolated portion of memory. The activities and behavior of the code are monitored in a quarantined maze to allow the code controlled access to aspects of the user device such as user files, photographs, a camera and a microphone. Access of the code is monitored until malicious activities are detected. For a clickable link, a remote website associated with the link are allowed controlled access to the user device within the virtual machine until malicious activities are detected.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VOIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, x=(x1, x2, x3, x4, . . . , xn), to a confidence that the input belongs to a class, that is, f(x) =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
a processing system including a processor; and
a memory that stores executable instructions that, when executed by the processing system, facilitate performance of operations, the operations comprising:
receiving, at the device, a message over a communication network from a remote source;
determining if the message includes a selectable link;
initiating a virtual machine in an isolated portion of the memory of the device, wherein the initiating the virtual machine is responsive to the determining the message includes the selectable link;
selecting, by the virtual machine, the selectable link within the isolated portion of the memory to cause executable code to execute on the virtual machine;
providing, on the virtual machine, access to a duplicate file shell by the executable code, wherein the duplicate file shell presents an appearance to the executable code matching appearance of user files of the memory;
monitoring, by an artificial intelligence module, activities of the executable code during the executing the executable code, wherein the monitoring the activities of the executable code comprises dynamically expanding the access to the duplicate file shell by the executable code in response to file access requests by the executable code;

determining if the executable code comprises malicious code, wherein the determining is responsive to the monitoring activities of the executable code; and deleting the executable code from the device in response to a determination that the executable code comprises malicious code.

2. The device of claim 1, wherein the monitoring the activities of the executable code further comprises monitoring processor cycles of the processor during the executing of the executable code.

3. The device of claim 2, wherein the determining if the executable code comprises malicious code comprises:

comparing a number of processor cycles of the processor with a predetermined processor cycle threshold; and determining the executable code comprises malicious code responsive to the number of processor cycles exceeding the predetermined processor cycle threshold.

4. The device of claim 1, wherein the monitoring the activities of the executable code further comprises monitoring an amount of memory access by the processor during the executing of the executable code.

5. The device of claim 4, wherein the determining if the executable code comprises malicious code comprises:

comparing the amount of the memory accessed by the executable code with a predetermined memory threshold; and determining the executable code comprises malicious code responsive to the amount of the memory accessed by the executable code exceeding the predetermined memory threshold.

6. The device of claim 1, wherein the operations further comprise:

accessing, by the virtual machine, a remote network location; and monitoring, by the artificial intelligence module, activities of the remote network location following the selecting of the selectable link.

7. The device of claim 6, wherein the monitoring the activities of the remote network location comprise:

detecting an attempt by the remote network location to access a file in the duplicate file shell; and monitoring further access to the duplicate file shell by the remote network location.

8. The device of claim 7, wherein the monitoring further access to the duplicate file shell comprises:

detecting an attempt by the remote network location to access a target user folder within duplicate user folders of the duplicate file shell, wherein the target user folder correlates with an actual user folder of actual user folders in the memory of the device;

copying contents of the actual user folder to the target user folder; and monitoring folder access to the target user folder by the remote network location.

9. The device of claim 1, wherein the operations further comprise:

receiving at the device an encrypted message, wherein the encrypted message generates a message display on a user interface of the device without contents of the encrypted message being readable by the processor;

taking a screenshot of the message display on the user interface; and processing the screenshot of the message display to identify the selectable link in the encrypted message.

10. The device of claim 9, wherein the operations further comprise:

accessing, by the virtual machine, a remote network location;

monitoring, by the artificial intelligence module, activities of the remote network location following the selecting of the selectable link; and detecting if the selectable link in the message comprises malicious code, wherein the determining is responsive to the monitoring the activities of the remote network location.

11. The device of claim 1, wherein the operations further comprise:

inferring, by the artificial intelligence module, an intent of the message; and wherein the determining if the executable code comprises malicious code comprises comparing the intent of the message with the activities of the executable code during the executing the executable code.

12. A non-transitory machine-readable medium, comprising executable instructions that, when executed by a processing system including a processor and a memory, facilitate performance of operations, the operations comprising:

identifying a selectable link in a communication received from a remote network location at a user device;

temporarily preventing a user of the user device from activating the selectable link during a review period;

initiating a virtual machine in an isolated portion of the memory of the processing system, wherein the initiating the virtual machine is responsive to the identifying the selectable link;

selecting, by the virtual machine, the selectable link within the isolated portion of the memory to cause executable code to execute on the virtual machine;

providing, on the virtual machine, access to a duplicate file shell by the executable code, wherein the duplicate file shell presents an appearance to the executable code matching appearance of user files of the memory;

monitoring, by an artificial intelligence module, activities of the executable code during the executing the executable code, wherein the monitoring the activities of the executable code comprises dynamically expanding the access to the duplicate file shell by the executable code in response to file access requests by the executable code;

determining if the executable code comprises malicious code, wherein the determining is responsive to the monitoring activities of the executable code; and deleting the executable code from the device in response to a determination that the executable code comprises malicious code.

13. The non-transitory machine-readable medium of claim 12, wherein the identifying the selectable link in the communication received from the remote network location at the user device comprises:

receiving at the user device an encrypted message, wherein the encrypted message generates a message display on a user interface of the user device without contents of the encrypted message being readable by the processor;

taking a screenshot of the message display on the user interface by the artificial intelligence module; and processing the screenshot of the message display to identify the selectable link in the encrypted message, producing identified links.

14. The non-transitory machine-readable medium of claim 12, wherein the operations further comprise:

detecting an attempt by the remote network location to access a target user folder within duplicate user folders of the duplicate file shell, wherein the target user folder correlates with an actual user folder of the user folders in the memory of the device;

copying contents of the actual user folder to the target user folder; and monitoring folder access to the target user folder by the remote network location.

15. The non-transitory machine-readable medium of claim 12, wherein the operations further comprise:

providing controlled access to the duplicate file shell for the remote network location, including copying from the user files and files sought to be accessed by the remote network location to the duplicate file shell;

detecting repetitive behavior by the remote network location directed toward a particular file of the duplicate file shell; and determining that the selectable link comprises malicious code based on the repetitive behavior.

16. The non-transitory machine-readable medium of claim 15, wherein the operations further comprise:

reporting information about the selectable link and the remote network location to a remote server for analysis with other information about malicious code and malicious links.

17. The non-transitory machine-readable medium of claim 16, wherein the operations further comprise:

receiving updated information from the remote server, wherein the updated information includes information about known malicious code and known malicious links;

accessing, by the artificial intelligence module, the updated information; and determining that the selectable link is a malicious link based at least in part on the updated information.

18. A method, comprising:

receiving, by a processing system including a processor and a memory, a communication from a remote source, wherein the communication is received over a data network and includes one of information defining a message or information defining a web page;

determining, by the processing system, if the message includes a selectable link;

initiating, by the processing system, a virtual machine in an isolated portion of the memory of the processing system, wherein the initiating the virtual machine is responsive to the determining the message includes the selectable link;

selecting, by the virtual machine, the selectable link within the isolated portion of the memory to cause executable code to execute on the virtual machine;

providing, by the processing system, on the virtual machine, access to a duplicate file shell by the executable code, wherein the duplicate file shell presents an appearance to the executable code matching appearance of user files of the memory;

monitoring, by an artificial intelligence module, activities of the executable code during the executing the executable code, wherein the monitoring the activities of the executable code comprises dynamically expanding, by the processing system, the access to the duplicate file shell by the executable code in response to file access requests by the executable code;

determining, by the processing system, if the executable code comprises malicious code, wherein the determining is responsive to the monitoring activities of the executable code; and deleting, by the processing system, the executable code from the processing system in response to a determination that the executable code comprises malicious code.

19. The method of claim 18, wherein the determining if the executable code comprises malicious code comprises:

comparing, by the processing system, processor usage with a processor threshold; and comparing, by the processing system, memory usage with a memory threshold.

20. The method of claim 18, wherein the determining if the executable code comprises malicious code comprises:

identifying an attempt by a remote network device to access the duplicate file shell.

* * * * *